US008762049B2

(12) United States Patent
Feng

(10) Patent No.: US 8,762,049 B2
(45) Date of Patent: Jun. 24, 2014

(54) NAVIGATION SYSTEM WITH EVENT OF INTEREST ROUTING MECHANISM AND METHOD OF OPERATION THEREOF

(75) Inventor: Hongwei Feng, Palo Alto, CA (US)

(73) Assignee: Telenav, Inc., Sunnyvale, CA (US)

( * ) Notice: Subject to any disclaimer, the term of this patent is extended or adjusted under 35 U.S.C. 154(b) by 586 days.

(21) Appl. No.: 12/578,132

(22) Filed: Oct. 13, 2009

(65) Prior Publication Data

US 2011/0087426 A1 Apr. 14, 2011

(51) Int. Cl.
*G01C 21/30* (2006.01)
(52) U.S. Cl.
USPC ............... 701/411; 701/1; 701/25; 701/410; 701/414; 701/533; 705/7.16; 703/1
(58) Field of Classification Search
CPC ............... G08G 1/096827; G08G 1/096872; G08G 1/096883; G01C 21/3415; G01C 21/3461; G01C 21/30; G01C 21/00; G01C 21/362; G06Q 10/109; H04M 2203/2072; Y10S 715/963
USPC ............ 701/4, 426, 120, 532, 32.2, 200, 204, 701/207, 209, 213, 220, 300, 414, 423; 717/170, 101; 705/1, 5, 7.16; 395/200.32
See application file for complete search history.

(56) References Cited

U.S. PATENT DOCUMENTS

| | | | |
|---|---|---|---|
| 5,790,974 A * | 8/1998 | Tognazzini | 455/456.5 |
| 5,924,075 A | 7/1999 | Kanemitsu | |
| 6,119,095 A | 9/2000 | Morita | |
| 6,266,614 B1 | 7/2001 | Alumbaugh | |
| 6,526,351 B2 | 2/2003 | Whitham | |
| 6,816,778 B2 | 11/2004 | Diaz | |
| 2002/0049533 A1* | 4/2002 | Kusano et al. | 701/209 |
| 2005/0192025 A1 | 9/2005 | Kaplan | |
| 2005/0222762 A1* | 10/2005 | Hamilton et al. | 701/210 |
| 2006/0106530 A1 | 5/2006 | Horvitz et al. | |
| 2007/0005235 A1* | 1/2007 | Suzuki et al. | 701/200 |
| 2008/0004794 A1* | 1/2008 | Horvitz | 701/200 |
| 2008/0167937 A1* | 7/2008 | Coughlin et al. | 705/9 |
| 2008/0167938 A1 | 7/2008 | Meisels et al. | |
| 2009/0005963 A1* | 1/2009 | Jarvinen | 701/201 |
| 2009/0006994 A1* | 1/2009 | Forstall et al. | 715/764 |
| 2009/0234659 A1* | 9/2009 | Liao et al. | 705/1 |
| 2011/0144906 A1* | 6/2011 | Suzuki et al. | 701/201 |

FOREIGN PATENT DOCUMENTS

WO WO 2009005713 A2 * 1/2009

OTHER PUBLICATIONS

WO2009005713_NPL.pdf.*
International Search Report for Application No. PCT/US2010/052567 dated Nov. 30, 2010.

* cited by examiner

*Primary Examiner* — Tuan C. To
*Assistant Examiner* — Jelani Smith
(74) *Attorney, Agent, or Firm* — IP Investment Law Group

(57) ABSTRACT

A method of operation of a navigation system includes: receiving a start location and a destination location; receiving a first start time associated with a first event; receiving a second start time associated with a second event with the first start time subsequent to the second start time and the first event closer to the start location than the second event; and generating an event route, for displaying on a device, from the start location to the second event to the first event to the destination location based on the first start time relative to the second start time.

20 Claims, 9 Drawing Sheets

NAVIGATION SYSTEM WITH EVENT OF INTEREST ROUTING MECHANISM AND METHOD OF OPERATION THEREOF

TECHNICAL FIELD

The present invention relates generally to a navigation system, and more particularly to a navigation system with event of interest routing mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Numerous technologies have been developed to utilize this new functionality.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone or a personal digital assistant (PDA).

Location based services allow users to create, transfer, store, and/or consume information in the "real world". One such use of location-based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information, when available or in service areas.

In response to consumer demand, navigation systems are providing ever-increasing functionality. Current navigation systems do not provide quick and easy ways to create tours and day trips. Unplanned or poorly planned trips can squander time and fuel. In contrast, efficient trips and tours can minimize time spent and reduce the stress of traveling. The advancements with navigation system need to incorporate these growing concerns.

Thus, a need still remains for a navigation system with event of interest routing mechanism, providing low cost, improved functionality, and improved reliability. In view of the ever-increasing need to save costs and improve efficiencies, it is more and more critical that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: receiving a start location and a destination location; receiving a first start time associated with a first event; receiving a second start time associated with a second event with the first start time subsequent to the second start time and the first event closer to the start location than the second event; and generating an event route, for displaying on a device, from the start location to the second event to the first event to the destination location based on the first start time relative to the second start time.

The present invention provides a navigation system including: a user interface for receiving a start location and a destination location; a select first start time module, coupled to a user interface, for receiving a first start time associated with a first event; a select second start time module, coupled to the select first start time module, for receiving a second start time associated with a second event with the first start time subsequent to the second start time; and a calculate route module, coupled to the select second start time module, for generating an event route, for displaying on a device, from the start location to the second event to the first event to the destination location based on the first start time relative to the second start time.

Certain embodiments of the invention have other aspects in addition to or in place of those mentioned above. The aspects can become apparent to those skilled in the art from a reading of the following detailed description when taken with reference to the accompanying drawings.

BEST MODE FOR CARRYING OUT THE INVENTION

Figure 1:
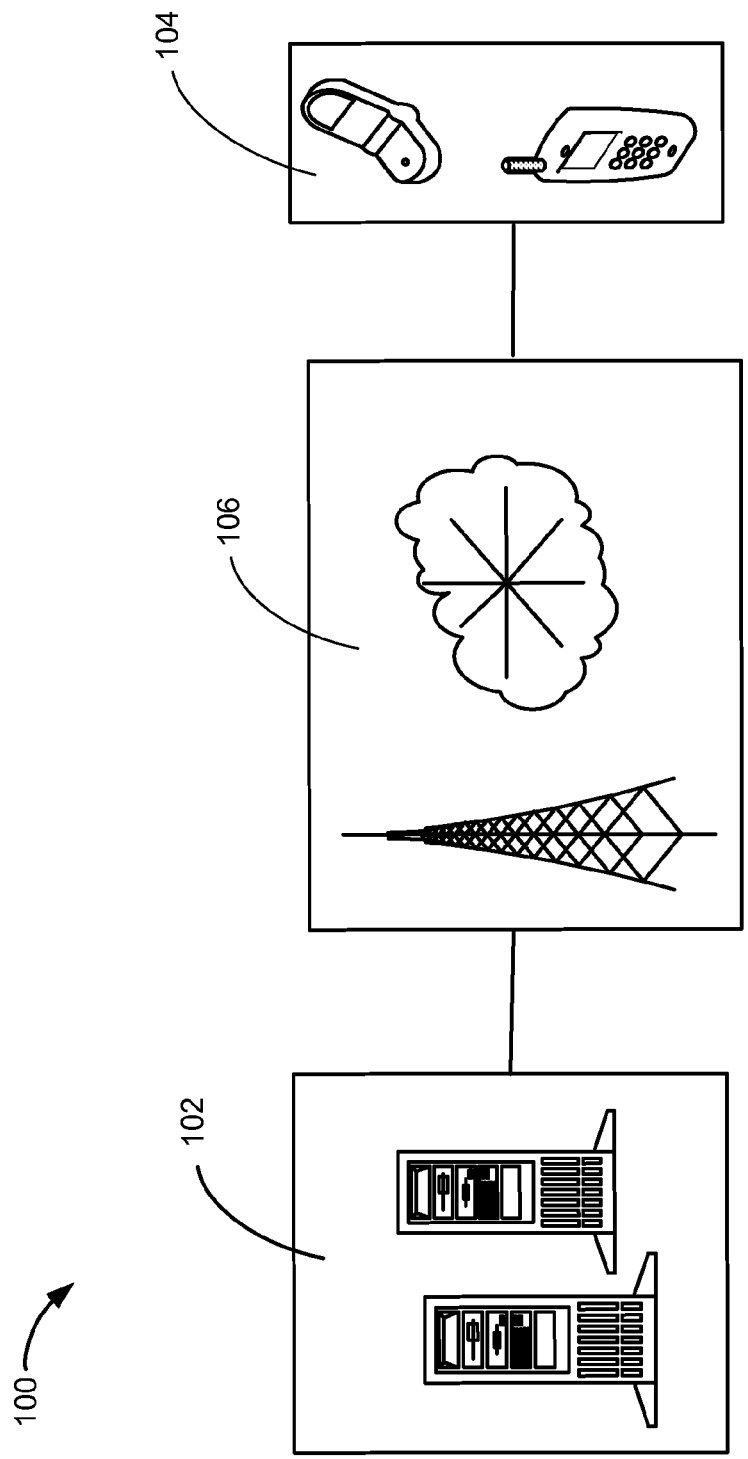
FIG. 1 is an example of an environment using an embodiment of the present invention.

The following embodiments are described in sufficient detail to enable those skilled in the art to make and use the invention. It is to be understood that other embodiments would be evident based on the present disclosure, and that system, process, or mechanical changes can be made without departing from the scope of the present invention.

In the following description, numerous specific details are given to provide a thorough understanding of the invention. However, it can be apparent that the invention can be practiced without these specific details. In order to avoid obscuring the present invention, some well-known circuits, system configurations, and process steps are not disclosed in detail. Likewise, the drawings showing embodiments of the system are semi-diagrammatic and not to scale and, particularly, some of the dimensions are for the clarity of presentation and are shown greatly exaggerated in the drawing FIGs.

Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

The term "module" referred to herein, can include software, hardware, or a combination thereof. For example, the software can be machine code, firmware, embedded code, and application software. Also for example, the hardware can be circuitry, processor, computer, integrated circuit, integrated circuit cores, or a combination thereof.

The term "event of interest" referred to herein, can include a location, a stop, and/or a waypoint. The stops can include locations around a wide geographic region or stops in a single location such as a museum. In the context of a city tour, an event of interest can include historical landmarks, parks, stores, and restaurants. In a museum example, an event of interest can include exhibits, theater show times, gift shops, and parked vehicles.

The term "itinerary" referred to herein, can include a schedule of events of interest for a day, across multiple days, over a vacation period, or locations. The itinerary can include information regarding appointment times of events of interest, arrival times of events of interest, duration times of events of interest, and departure times of events of interest.

Referring now to FIG. 1, therein is an example of an environment 100 using an embodiment of the present invention. The environment 100 applies to any embodiment of the present invention described later. The environment includes a first device 102, such as a server or client. The first device 102 can be linked to a second device 104, such as a client or server, with a communication path 106, such as a network.

The first device 102 can be any of a variety of centralized or decentralized computing devices. For example, the first device 102 can be a computer, a computer in a grid computing pool, a virtualized computer, a computer in a cloud computing pool, or a computer in a distributed computing topology. The first device 102 can include routing functions or switching functions for coupling with the communication path 106 to communicate with the second device 104.

As a further example, the first device 102 can be a particularized machine, such as a mainframe server, a cluster server, rack mounted server, or a blade server, or as more specific examples, an IBM System z10 (TM), Business Class mainframe or a HP ProLiant ML (TM).

The second device 104 can be of any of a variety of mobile devices. For example, the second device 104 can be a cellular phone, personal digital assistant, a notebook computer, or other multi-functional mobile communication or entertainment devices having means for coupling to the communication path 106.

As a further example, the second device 104 can be a particularized machine, such as a portable computing device, a notebook, a netbook, a smartphone, a personal digital assistant, or a cellular phone, and as specific examples, an Apple iPhone (TM), Palm Centro (TM), or a Moto Q Global (TM), The communication path 106 can be a variety of networks. For example, the communication path 106 can include wireless communication, wired communication, optical, ultrasonic, or the combination thereof. Satellite communication, cellular communication, Bluetooth, Infrared Data Association standard (IrDA), radio data system (RDS), high density (HD) radio data, wireless fidelity (WiFi), and worldwide interoperability for microwave access (WiMAX) are examples of wireless communication that can be included in the communication path 106. Ethernet, digital subscriber line (DSL), fiber to the home (FTTH), and plain old telephone service (POTS) are examples of wired communication that can be included in the communication path 106.

Further, the communication path 106 can traverse a number of network topologies and distances. For example, the communication path 106 can include personal area network (PAN), local area network (LAN), metropolitan area network (MAN), and wide area network (WAN).

For illustrative purposes, the first device 102 is shown in a single location, although it is understood that the server can be centralized or decentralized and located at different locations. For example, the first device 102 can represent real or virtual servers in a single computer room, distributed across different rooms, distributed across different geographical locations, embedded within a telecommunications network, virtualized servers within one or more other computer systems including grid or cloud type computing resources, or in a high powered client device.

Also for illustrative purposes, the environment 100 is shown with the second device 104 as a mobile computing device, although it is understood that the second device 104 can be different types of computing devices. For example, the second device 104 can be a mobile computing device, such as notebook computer, another client device, or a different type of client device.

Further for illustrative purposes, the environment 100 is shown with the first device 102 and the second device 104 as end points of the communication path 106, although it is understood that the environment 100 can have a different partition between the first device 102, the second device 104, and the communication path 106. For example, the first device 102, the second device 104, or a combination thereof can also function as part of the communication path 106.

Figure 2:
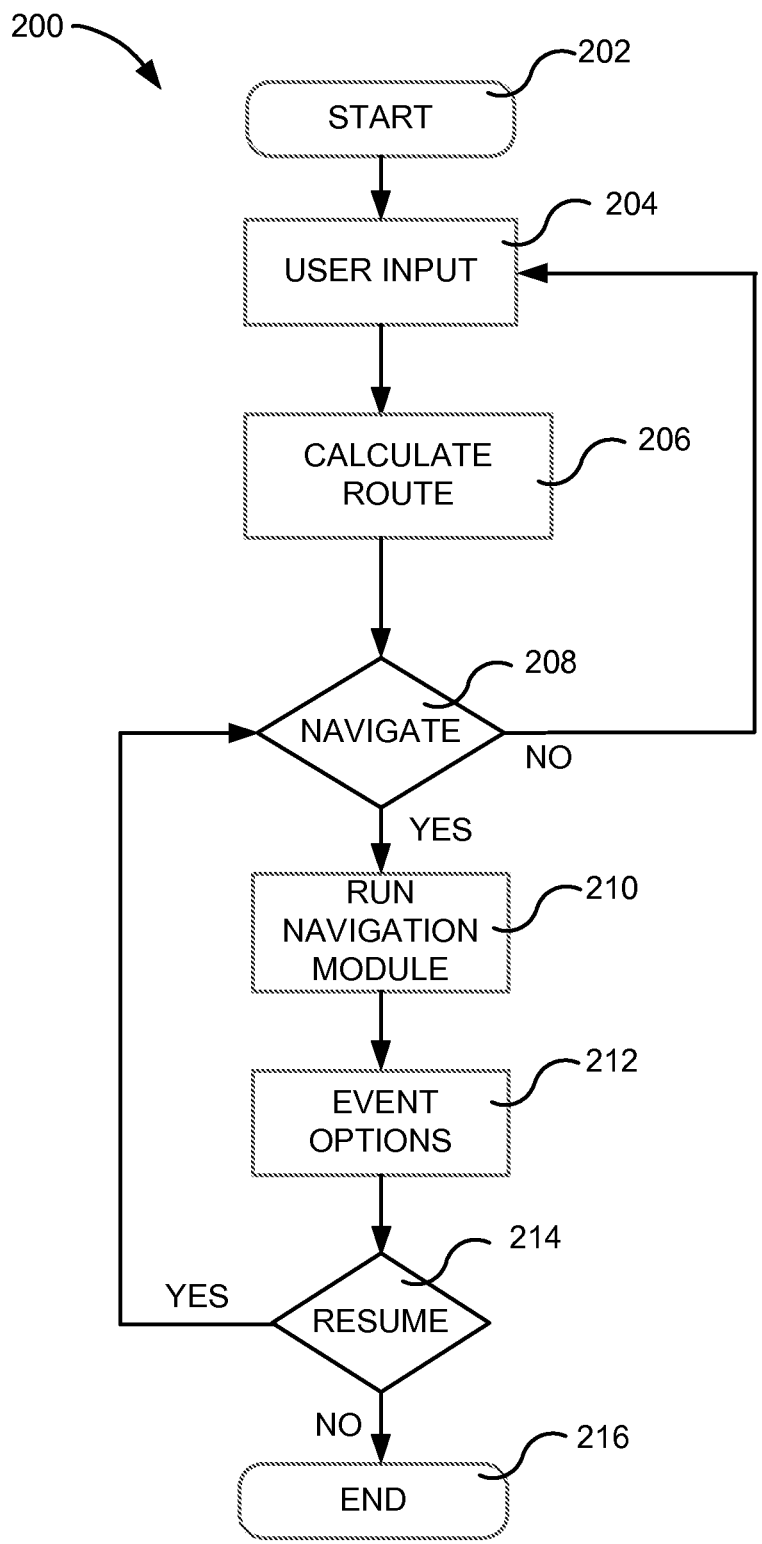
FIG. 2 is a flow chart for operating a navigation system with event of interest routing mechanism in a first embodiment of the present invention.

Referring now to FIG. 2, therein is shown a flow chart for operating a navigation system 200 with event of interest routing mechanism in a first embodiment of the present invention. The navigation system 200 can generate and modify itineraries and routes based on events of interest, event start times, event duration times, and any changes to thereof.

A start module 202 depicts starting the user selection function. The "start" word is not to imply an absolute start of the invention but the word "start" is used for convenience to denote a particular entry point for this example of the present invention. The process can then pass to a user input module 204. The user input module 204 can display menus to the user and prompt the user to input information for operating the navigation system 200. The user input module 204 will be explained in greater detail below. The user input module 204 can progress to a calculate route module 206.

The calculate route module 206 can generate routes. The calculate route module 206 can also display information that can assist in generating an itinerary. The calculate route module 206 will be explained in greater detail below. After generating a route, the process can progress to a navigation decision module 208.

The navigation decision module 208 can depict an option to continue to a run navigation module 210 or an option to return to the user input module 204. If the navigation decision module 208 is set to yes, the process passes to the run navigation module 210. If the navigation decision module 208 is set to no, the process passes to the user input module 204. At the user input module 204, the user can create a new itinerary or modify the previous itinerary.

The run navigation module 210 can display route instructions as a multimedia display. The multimedia route instructions can include turn-by turn instructions in text, graphics, audio prompts, or a combination thereof. The run navigation module 210 can also play multimedia information about the surrounding area and about the upcoming event of interest. The process can then pass to an event options module 212.

The event options module 212 can provide available services at an event of interest. For example, if available, the user can request maps and multimedia information regarding the event of interest. The event options module 212 can execute tour programs and provide routing instructions within the event of interest. For example, the event of interest can be a historical landmark, and the event options module 212 can play a tour about the historical landmark. The event options module 212 can provide routing instructions to events of interest around or within the historical landmark.

The event options module 212 can also display an alert of the next event of interest start time. For example, the alert can warn that the next event start time is approaching and provide an estimation of how much time is required to reach the next event of interest. At the conclusion of an event of interest, the process can pass to a resume decision module 214.

The resume decision module 214 depicts the option to resume or end the process. If the resume decision module 214 is set to yes, the process passes to the navigation decision module 208. The navigation decision module 208 can execute the run navigation module 210 to navigate to the next event of interest on the itinerary. If the itinerary has expired or the user decides to modify the itinerary, the navigation decision module 208 is set to no. The process can then return to the user input module 204. An itinerary can expire if it is not possible to reach an event of interest by the start time of the event.

If the resume decision module 214 is set to no, the process passes to an end module 216. The "end" word is not to imply an absolute end of the invention but the word "end" is used for convenience to denote a particular exit point for this example of the present invention. The end module 216 can depict one possible end of the process.

Figure 3:
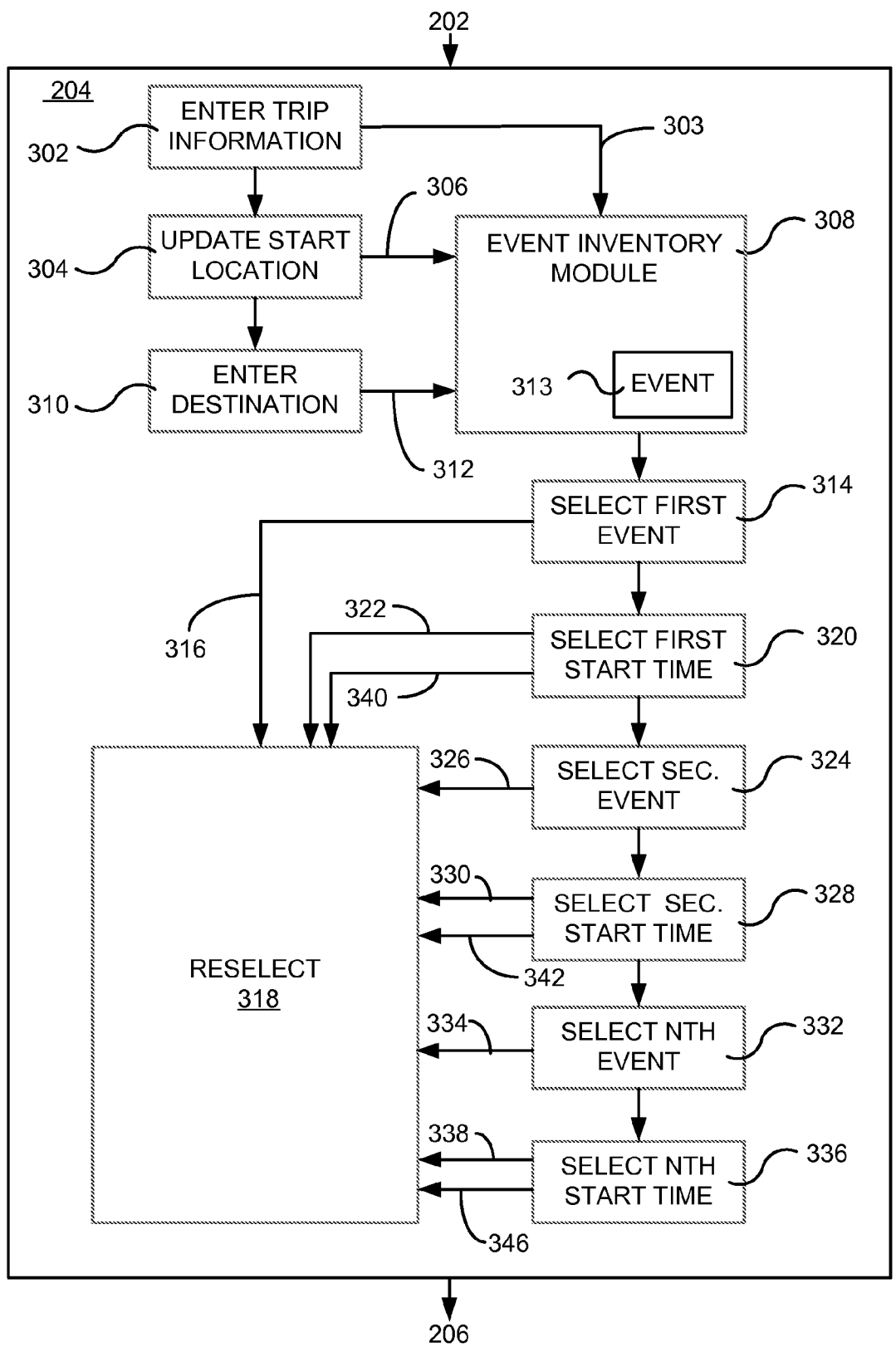
FIG. 3 is a flow chart of the user input module of FIG. 2.

Referring now to FIG. 3, therein is shown a flow chart of the user input module 204 of FIG. 2. The user input module 204 is linked to the start module 202 and the calculate route module 206 of FIG. 2.

The user input module 204 can include a enter trip information module 302, an update start location module 304, an enter destination module 310, an event inventory module 308, and an event inventory 313. The user input module 204 can also include a select first event module 314, a reselect module 318, a select first start time module 320, a select second event module 324, a select second start time module 328, a select nth event module 332, and a select nth start time module 336.

The select nth event module 332 and the select nth start time module 336 can represent subsequent event of interest selections. For example, the "nth" notation can represent the "nth" event from the first event in a given itinerary, where "n" can represent a positive integer number.

The enter trip information module 302 can receive input from the user to generate a trip information 303. The trip information 303 can include, for example, the target city of the trip, the target dates of the trip, the start time of the trip or other information relating to a trip. The enter trip information module 302 can send the trip information 303 to the event inventory module 308. The trip information 303 can be used by the event inventory module 308 to update the event inventory 313. The process can pass to the update start location module 304 from the enter trip information module 302.

The update start location module 304 can detect a start location 306. The start location 306 can represent a current location of the second device 104 of FIG. 1, as an example. The start location 306 can be determined through various methods. For example, the update start location module 304 can utilize a global positioning system (GPS), inertial navigation system, cell-tower location system, accelerometer location system, or any combination thereof to determine the start location 306. Additionally, the start location 306 can be received through user input into the update start location module 304.

The update start location module 304 can send the start location 306 to the event inventory module 308. After sending the start location 306 to the event inventory module 308, the process can pass to the enter destination module 310 from the update start location module 304.

The enter destination module 310 can allow the selection of a destination location 312 as a user input or based on the event inventory. The destination location 312 can include the last stop or an intermediate on the route. The destination location 312 can be selected from the event inventory 313 or can be manually inputted. For example, the destination location 312 can be the start location 306, an intersection, an address, an event of interest, a location in another city, a location in another state or province, or a parked vehicle. The enter destination module 310 can send the destination location 312 to the event inventory module 308. The process can then pass to the event inventory module 308.

The event inventory module 308 can update the event inventory 313. The event inventory 313 can represent a database of events of interests and start times associated with the events of interest. The event inventory 313 can also include pre-generated tours based on a city, a region, the start location 306, the destination location 312, a calendar period, or a combination thereof.

The event inventory module 308 can receive and utilize the trip information 303, the start location 306, and the destination location 312 to update the event inventory 313. Updates can be based on region, season, and other criteria. For example, the event inventory module 308 can update the event inventory 313 for local festivals and concerts. Events such as concerts require updates to the event inventory 313 because concerts can occur at certain times of the year and at different venues.

The event inventory module 308 can be used to search for specific events of interest. Additionally, the user can create new events of interest by inputting the location, the event start time, and the event duration into the event inventory 313. The event inventory module 308 can display the contents of the event inventory 313 including event start times and event duration times. The process can then pass to the select first event module 314.

The select first event module 314 can allow the selection of a first event 316 from the event inventory 313. The user can search the event inventory 313 in order to make the selection. The select first event module 314 can send the first event 316 to the reselect module 318. The first event 316 can represent any location stored or inputted into the event inventory 313.

The first event 316 can also include a pre-generated tour from the event inventory 313. Pre-generated tours can include tours based on different themes, interest, regions, calendar times, or any combination thereof. The process can pass from the select first event module 314 to the select first start time module 320. If the first event 316 is a pre-generated tour, the process can pass directly to the reselect module 318.

The select first start time module 320 can allow the selection of a first start time 322 and a first stop time 340 from the event inventory 313. The first start time 322 can include a suggested arrival time associated with the first event 316. The first stop time 340 can depict the conclusion time or the duration of the first event 316. The first start time 322 and the first stop time 340 can also be inputted by the user.

For example, the first event 316 can represent a theme park. The first start time 322 can be set to a 9:00 am arrival time. The first stop time 340 can be set to 3:00 pm. In addition, the first stop time 340 can be set to 6-hour duration from the first start time 322.

The select first start time module 320 can be bypassed because the first event 316 may not have a start time associated with the event. For example, the user may need to stop at the user's residence before traveling to other events of interest. The first event 316 can be set to the user's residence and no values can be inputted into the select first start time module 320.

The select first start time module 320 can send the first start time 322 and the first stop time 340 to the reselect module 318. The process can pass from the select first start time module 320 to the select second event module 324.

The select second event module 324 can function in a similar method as the select first event module 314. The select second event module 324 can allow the selection of a second event 326 from the event inventory 313. The select second event module 324 can send the second event 326 to the reselect module 318. The process can then pass to the select second start time module 328.

The select second start time module 328 can function in a similar method as the select first start time module 320. The select second start time module 328 can allow the selection of a second start time 330 and a second stop time 342 from the event inventory 313. The select second start time module 328 can send the second start time 330 and the second stop time 342 to the reselect module 318. The process can repeat up to "n" number of events and "n" is a positive integer. The process can then pass to the select nth event module 332.

The select nth event module 332 can represent subsequent inputs of event of interest. The select nth event module 332 can allow the user to input an nth event 334. The select nth event module 332 can send the nth event 334 to the reselect module 318.

The select nth start time module 336 can represent subsequent "nth" start time and stop time inputs. The select nth start time module 336 can allow the user to input an nth start time 338 and an nth stop time 346. The select nth start time module 336 can send the nth start time 338 and the nth stop time 346 to the reselect module 318. This process can repeat until the user has finished inputting events and time information.

For illustrative purposes, the modules of the user input module 204 are described as discrete functional modules, although it is understood that the modules of the user input module 204 can have a different configuration. For example, the select first event module 314, the select first start time module 320, the select second event module 324, and the select second start time module 328 may not be discrete functional modules but may have one or more of the aforementioned modules combined into one functional module.

The reselect module 318 can allow a new value to be entered into the select first event module 314, the select first start time module 320, the select second event module 324, the select second start time module 328, the select nth event module 332, and the select nth start time module 336. For example, the reselect module 318 can allow changes or mistakes to be corrected for the event of interest information.

If the reselect module 318 received the first event 316 as a pre-generated tour, the reselect module 318 can display each event of interest within the tour. The reselect module 318 can automatically assign event start times and event stop times from the pre-generated tour. The reselect module 318 can also customize the pre-generated tour with user-defined content. After the event of interest information has been entered, the process can pass to the calculate route module 206 of FIG. 2.

Figure 4:
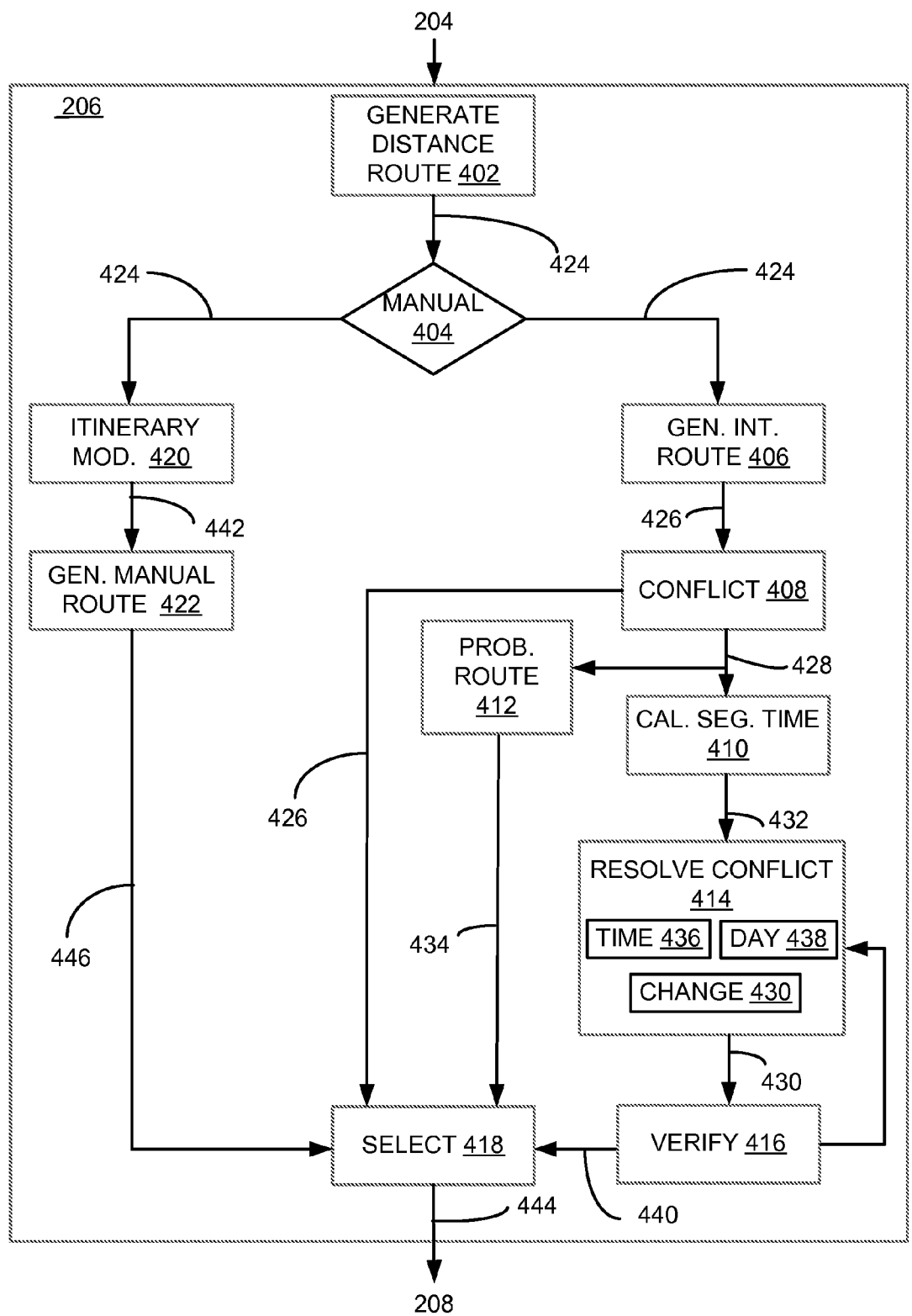
FIG. 4 is a flow chart of the calculate route module of FIG. 2.

Referring now to FIG. 4, therein is shown a flow chart of the calculate route module 206 of FIG. 2. The calculate route module 206 can receive the itinerary information of each event of interest from the user input module 204 of FIG. 2. The calculate route module 206 can include a generate distance route module 402, a manual decision module 404, a generate intermediate route module 406, a detect conflict module 408, a calculate segment time module 410, a probability route module 412, a resolve conflict module 414, a verify module 416, a select route module 418, an itinerary module 420, and a generate manual route module 422.

The generate distance route module 402 can calculate a distance route 424. The distance route 424 can represent a route to each event of interest that utilizes the shortest available distance between the start location 306 of FIG. 3, the destination location 312 of FIG. 3, and the user-defined events of interest. The distance route 424 can also represent the route of a pre-generated tour that utilizes the shortest distance. The generate distance route module 402 can send the distance route 424 to the manual decision module 404.

Based on the events of interest, the generate distance route module 402 can generate a route based on the shortest total distance. For example, the distance route 424 can represent a route that minimizes backtracking The distance route 424 can be used as an example if the user decides to generate a route manually.

The manual decision module 404 can depict an option for the process to pass to the generate intermediate route module 406 or to pass to the itinerary module 420. The manual decision module 404 can allow the user to generate an itinerary manually and route or to have the user select an automatically generated route.

If the user chooses an automatically generated route, the process can pass to the generate intermediate route module 406. If the user chooses to generate an itinerary and route manually, the process can pass to the itinerary module 420. The manual decision module 404 can send the distance route 424 to the itinerary module 420 or the generate intermediate route module 406.

The generate intermediate route module 406 can generate an intermediate route 426. The intermediate route 426 can represent a route that incorporates the available time information from the user input module 204. The intermediate route 426 can include the start and stop time associations from the user input module 204 for each event of interest. If no times are entered into the user input module 204, the intermediate route 426 can be the same as the distance route 424. The generate intermediate route module 406 can send the intermediate route 426 to the detect conflict module 408.

The detect conflict module 408 can scan the intermediate route 426 to detect a conflict 428. The conflict 428 can represent information including problems between the events of interest that would make the intermediate route 426 invalid when navigating. The intermediate route 426 can be invalid if two events of interest are assigned to the same event start time or are overlapping. For example, the second start time 330 of FIG. 3 can be in-between the first start time 322 of FIG. 3 and the first stop time 340 of FIG. 3 where the first event 316 overlaps the second event 326.

Further for example, the conflict 428 can represent an overbooked or expired event of interest. A movie theater can sell out of tickets for that scheduled time. The conflict 428 can also include the first event 316 being too far away from the second event 326 so that the user does not have enough time to reach the second event by the second start time 330.

If the detect conflict module 408 does not detect the conflict 428, the detect conflict module 408 can send the intermediate route 426 to the select route module 418. If the detect conflict module 408 detects the conflict 428, the detect conflict module 408 can send the conflict 428 to the calculate segment time module 410.

The calculate segment time module 410 can generate a segment travel time 432. The segment travel time 432 can represent the travel time between the event of interest with the conflict 428 and other events of interest. The segment travel time 432 can be used to modify the route to remove the conflict 428. The calculate segment time module 410 can also determine if the user has enough time to reach each event of interest that is scheduled on the intermediate route 426.

The calculate segment time module 410 can send the segment travel time 432 to the resolve conflict module 414. The calculate segment time module 410 can also send the segment travel time 432 to the probability route module 412.

The resolve conflict module 414 can receive the segment travel time 432 from the calculate segment time module 410. The resolve conflict module 414 can use the segment travel time 432, the distance route 424, the trip information 303 of FIG. 3, and the event inventory 313 of FIG. 3 to modify the intermediate route 426. The resolve conflict module 414 can remove the conflict 428 from the intermediate route 426 by assigning events of interest to an alternative time 436 or a different day 438.

The alternative time 436 can represent instructions to reassign each event of interest or a portion of the events of interest to a different time to remove the conflict 428. These reassignments can resolve the conflict 428. The different day 438 can represent information that is similar to the alternative time 436. If the route is a multiple-day route, the different day 438 can represent instructions to reassign events of interest to a different day to resolve the conflict 428.

If the trip information 303 is set to a multiple day trip, the different day 438 can be assigned to a non-conflicting day and time based on the distance route 424, the intermediate route 426, and the segment travel time 432. For example, the resolve conflict module 414 can start with the distance route 424 to compute a different version of the intermediate route 426 to remove the conflict 428 across multiple days. The segment travel time 432 between events of interests can be used to calculate if the conflict 428 exists. As another example, the resolve conflict module 414 can start with the intermediate route 426 to compute a different version of the intermediate route 426 to remove the conflict 428 across multiple days.

If the trip information 303 is set to one day, the resolve conflict module 414 can assign the alternative time 436 to a non-conflicting time based on the distance route 424, the intermediate route 426, and the segment travel time 432. For example, the resolve conflict module 414 can start with the distance route 424 to compute a different version of the intermediate route 426 to remove the conflict 428 within the one day. The segment travel time 432 between events of interests can be used to calculate if the conflict 428 exists. As another example, the resolve conflict module 414 can start with the intermediate route 426 to compute a different version of the intermediate route 426 to remove the conflict 428 within the one day.

The resolve conflict module 414 can resolve a conflict resulting from a change 430, such as a change in schedule, a cancellation, or an additional showing, in one or more of the events of interest along the intermediate route 426. The change 430 can represent the modifications to the events of interest in the route. The change 430 can be from the event inventory 313 of FIG. 3. The change 430 can include the alternative time 436, the different day 438, or a combination thereof. The change 430 can be sent to the verify module 416.

The verify module 416 can verify that the intermediate route 426 does not have the conflict 428 by searching for conflicts based on the change 430. The verify module 416 can also recheck the status of each event of interest before the user begins navigating the route. For example, the event of interest, such as a concert, can quickly sell out during the process. If the verify module 416 detects new problem with the intermediate route 426, the verify module 416 can return processing the intermediate route 426 to the resolve conflict module 414.

The resolve conflict module 414 can remove the conflicts based on the change 430. For example, if the first event 316 is assigned to the alternative time 436 that is after the second event 326, the verify module 416 can verify that the second stop time of the second event 326 plus the segment travel time 432 is prior to the first start time 322. If the conflict 428 still remains between the first event 316 and the second event 326, the resolve conflict module 414 can remove the conflict 428, as described in the earlier example. The process can repeat until the verify module 416 no longer detects the conflict 428 based on the change 430.

The verify module 416 can generate a verified route 440 based on the change 430. The verified route 440 can represent a route without any conflicts. The verify module 416 can send the verified route 440 to the select route module 418.

It has been discovered that the present invention provides a navigation system with event of interest routing mechanism. The navigation system can generate and modify routes based on time associations to events of interest. For example, the navigation system can remove conflicts in a route by rearranging the order of events of interest while prioritizing a route with the shortest distance.

The probability route module 412 can receive the conflict 428. The probability route module 412 can generate a change probability route 434. The change probability route 434 can function as an alternative route to the verified route 440 and will be explained in greater detail below. The probability route module 412 can send the change probability route 434 to the select route module 418.

The itinerary module 420 can allow the selection of a user-defined itinerary and route. The itinerary module 420 can depict the option for a user to select the route manually as an alternative to the verified route 440 and the probability route module 412. The itinerary module 420 can generate a trip itinerary 442. The trip itinerary 442 can represent a user-defined schedule of each event of interest.

The itinerary module 420 can display traffic, distance, and estimated arrival time associated with events of interest in the distance route 424. The itinerary module 420 can also provide a graphical display of the distance route 424, such as a map, with each event of interest as a point on the map. The itinerary module 420 can be used to customize the trip itinerary 442. The itinerary module 420 can send the trip itinerary 442 to the generate manual route module 422.

The generate manual route module 422 can receive the trip itinerary 442. The generate manual route module 422 can convert the trip itinerary 442 into a manual route 446. The manual route 446 can be sent to the select route module 418.

The select route module 418 can generate an event route 444. The event route 444 can represent the selection of the manual route 446, the change probability route 434, or the verified route 440 that will be used for navigation. The event route 444 can be sent to the run navigation module 210 of FIG. 2.

The select route module 418 can display information about the manual route 446, the change probability route 434, and the verified route 440 to the user. For example, the select route module 418 can display the total time and total distance for the manual route 446, the change probability route 434, and the verified route 440. The select route module 418 can send the event route 444 to the navigation decision module 208. The process can then pass to the navigation decision module 208.

It has been also discovered that the present invention provides a navigation system that dynamically adapts to changes along an event route based on changes to events along the event route. If an event schedule changes, such as cancellations, rescheduling existing event times, or adding additional event times, the navigation system can dynamically adapt the event route as the changes.

Figure 5:
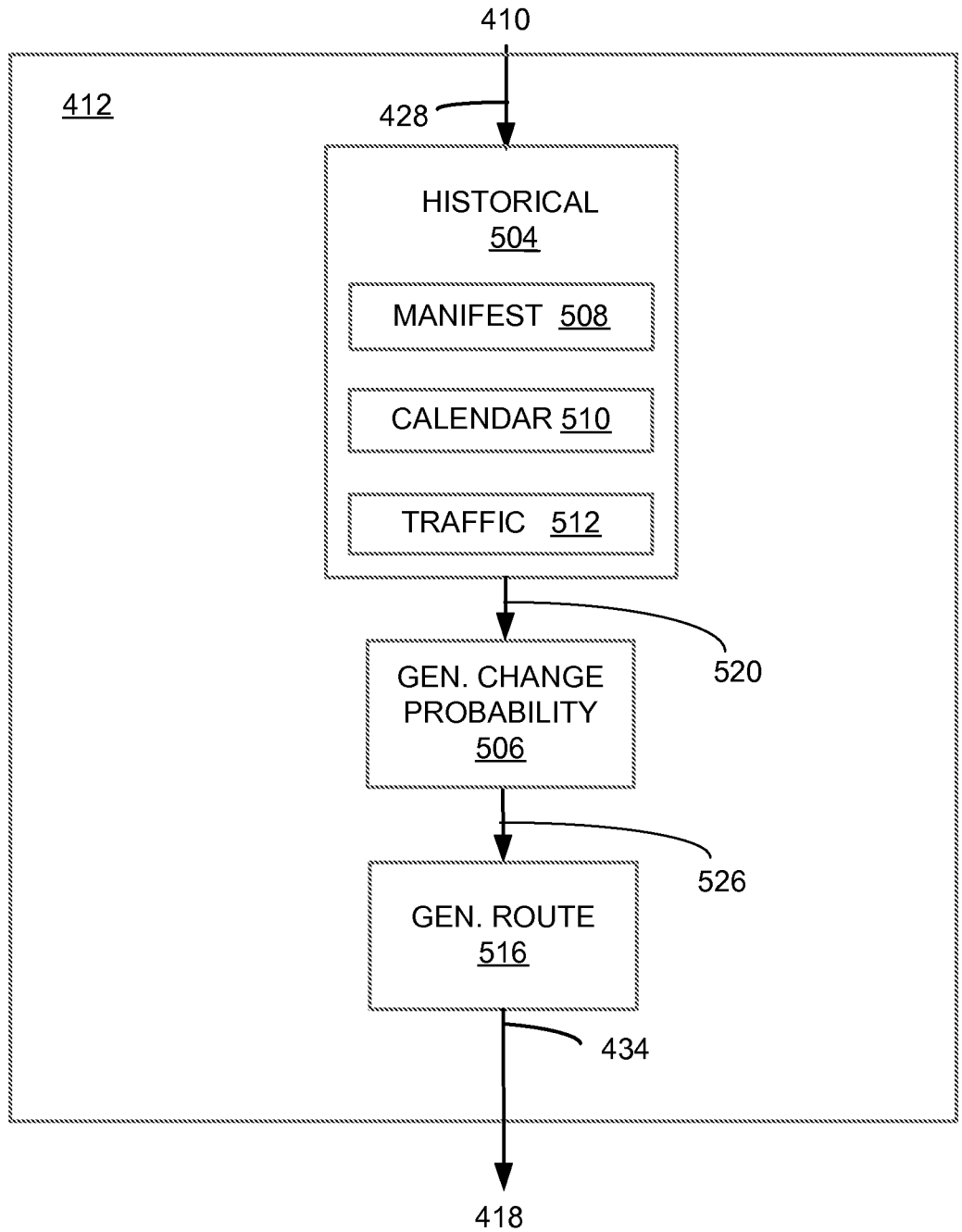
FIG. 5 is a flow chart of the probability route module of FIG. 4.

Referring now to FIG. 5, therein is shown a flow chart of the probability route module 412 of FIG. 4. The probability route module 412 considers possible changes to the event route 444 of FIG. 4 based on the probability of changes to any one of the event of interest along the event route 444. This allows users to select the event route 444 that can have the conflict 428 for a desirable event and working with the probability of changes that the conflicts will resolve themselves before the actual conflict occurs.

Instead of reassigning the events having the conflict 428 to another time or day, the probability route module 412 can extrapolate a percentage that the conflict 428 will resolve itself at a later scheduled start time. If this percentage is high, the probability route module 412 can provide an option for the event route 444 that includes the conflict 428.

The probability route module 412 can include a historical module 504, a generate change probability route module 506, and a generate route module 516. The historical module 504 can include a manifest module 508, a calendar module 510, and a traffic module 512.

For illustrative purposes, the modules of the probability route module 412 are described as discrete functional modules, although it is understood that these modules can have a different configuration. For example, the manifest module 508, the historical module 504, the calendar module 510, the traffic module 512, the generate route module 516, and the generate change probability route module 506 may not be discrete functional modules but may have one or more of the aforementioned modules combined into one functional module.

For example, at the time of scheduling the route, an event of interest can be filled or overbooked. For illustrative purposes, the event of interest can be a boat tour or concert. The probability route module 412 can determine the probability that the filled or overbooked event of interest will open, due to a canceling of a reservation for the event. For example, a user can start a day trip in the morning and schedule the boat tour in the afternoon. While scheduling the trip in the morning, the boat tour was overbooked. The probability route module 412 can determined the probability that the seat will open up in the afternoon and the user can plan the day trip accordingly.

The historical module 504 can provide historical changes for the events along the intermediate route 426 of FIG. 4. The historical module 504 can request information from the manifest module 508, the calendar module 510, and the traffic module 512.

The historical module 504 can generate a historical information 520. The historical information 520 can include information from the manifest module 508, the calendar module 510, and the traffic module 512.

The manifest module 508 can search manifests, guest lists, seating charts, and ticket list information. For example, the manifest module 508 can access the standby list for an air flight or ticket information for a concert. The manifest module 508 can make reservations or place the user on the waiting list for an event of interest and display the user's position of the waitlist. The manifest module 508 can contribute information to the historical information 520.

The calendar module 510 can analyze seasonal and time information. For example, the calendar module 510 can analyze information including off-season, and off-peak hours that can affect the demand for events of interest like restaurant reservations and theme park ride lines. During off-season or at off-peak times, the probability of an opening in an overbooked or closed event of interest increases. The calendar module 510 can contribute information to the historical information 520.

The traffic module 512 can track traffic statistics that can affect the segment travel time 432 of FIG. 4. The traffic module 512 can use the calendar module 510 to determine seasonal traffic statistics. For example, the conflict 428 can represent an event of interest at 4:00 pm and the next event of interest at 4:30 pm. The conflict 428 can be based on the typical travel segment time of 45 minutes between the events of interest. The user does not have enough time to reach the next event of interest because of the typical travel time.

With off-season or off-peak conditions, the traffic module 512 can detect a reduction in traffic that can increase the probability that the user will reach the next event of interest in time. For example, because of light traffic, the segment travel time 432 can become 28 minutes. The traffic module 512 can contribute information to the historical information 520.

The generate change probability module 506 can receive the historical information 520. The generate change probability module 506 can extrapolate a change probability 526 based on the historical information 520. The change probability 526 can represent the probability that the conflict 428 can be resolved at the time the event of interest is scheduled or before the intermediate route 426 reaches that event.

When generating the change probability 526, the generate change probability module 506 analyzes the historical information 520, such as historical changes, trends in cancellations, seasonal traffic conditions, and current conditions about the event. The generate change probability module 506 can send the change probability 526 to the generate route module 516.

It has been further discovered that the present invention provides a navigation system generating possible event routes based on the change probability. Although the event route can have the conflict, the event route could be an efficient route that minimizes time spent, minimizes distance traveled, and has a high percent rate of success regardless of the conflict.

For example, the navigation system 200 can generate the even route 444 with the change probability 526 of 85 percent of removing the conflict 428. At the time when the intermediate route 426 was generated, the intermediate route 426 had the conflict 428. The example 85 percent value for the change probability 526 can represent a high probability that the conflict 428 will be resolved at a future time. The navigation system 200 that can detect the change probability 526 can open up routing options that would normally not be available to other navigation systems.

The physical transformation of the distance route 424, the intermediate route 426, the verified route 440, the change probability route 434, and the event route 444 results in movement in the physical world, such as people using the second device 104 of FIG. 1 or vehicles, based on the operation of the navigation system 200. As the movement in the physical world occurs, the movement itself creates additional information that is converted back to the distance route 424, the intermediate route 426, the verified route 440, the change probability route 434, and the event route 444 for the continued operation of the navigation system 200 and to continue the movement in the physical world.

The generate route module 516 can receive the change probability 526. The generate route module 516 can generate the change probability route 434 of FIG. 4 based on the change probability 526. The generate route module 516 can send the change probability route 434 to the select route module 418 of FIG. 4.

Figure 6:
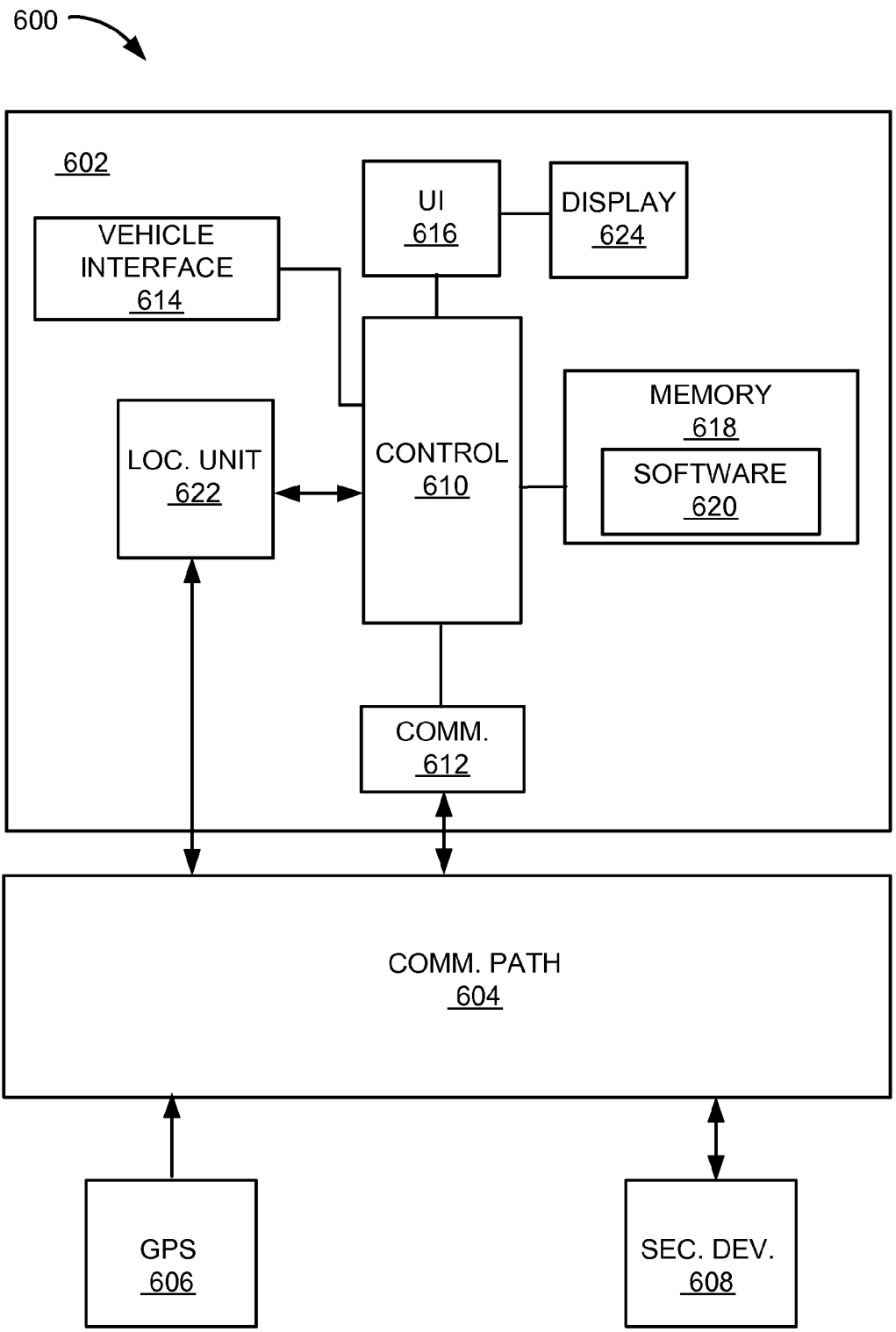
FIG. 6 is a block diagram of a navigation system with event of interest routing mechanism in a second embodiment of the present invention.

Referring now to FIG. 6, therein is shown a block diagram of a navigation system 600 with event of interest routing mechanism in a second embodiment of the present invention. The navigation system 600 can include a device 602 that can link to a communication path 604. The device 602 can represent the second device 104 of FIG. 1. The communication path 604 can link to a global positioning system 606. The communication path 604 can be linked to a second device 608, such as a server.

The device 602 can access the communication path 604 for location services, such as the global positioning system 606. The device 602 can be any of a variety of centralized or decentralized computing devices or any of a variety of mobile devices. For example, the device 602 can be a computer, a computer in a grid computing pool, a virtualized computer, a computer in a cloud computing pool, or a computer in a distributed computing topology. The device 602 can include routing functions or switching functions for coupling with the communication path 604.

As another example, the device 602 can be a cellular phone, personal digital assistant, a notebook computer, or other multi-functional mobile communication or entertainment devices having means for coupling to the communication path 604. The communication path 604 can include the same variety of networks listed in the communication path 106 of FIG. 1.

The device 602 can include a number of functional units. For example, the device 602 can include a control unit 610 such as a processor or computer, a communication unit 612, a vehicle interface unit 614, a user interface 616, a memory 618, a first software 620, a location unit 622, and a display interface 624.

The components illustrated in FIG. 6 are provided for the purposes of explaining and describing the present invention and are not intended to imply any architectural limitations. Varieties of alternative implementations for the navigation system 600 are possible for the present invention.

The control unit 610 can be coupled to the communication unit 612, the vehicle interface unit 614, the user interface 616, the memory 618, and the location unit 622. The memory 618 can include the first software 620. The user interface 616 can be linked to the display interface 624.

The display interface 624 can include a display or a projector. The user interface 616 can include a key pad, a touch-pad, soft-keys, a keyboard, a microphone, a speaker, or any combination thereof to provide data and command inputs for the navigation system 600.

For illustrative purposes, the navigation system 600 is described with discrete functional units, although it is understood that the navigation system 600 can have a different configuration. For example, the control unit 610, the communication unit 612, the vehicle interface unit 614, and the location unit 622 may not be discrete functional units but may have one or more of the aforementioned units combined into one functional unit.

The first software 620 can include the navigation system 200 of FIG. 2. The control unit 610 can execute the first software 620 and can provide the intelligence of the device 602. The control unit 610 can interact with the vehicle interface unit 614, the communication path 604 via the communication unit 612, and the user interface 616.

The vehicle interface unit 614 can interact with a vehicle or other device such as a laptop. For example, if linked to a vehicle, the vehicle interface unit 614 can access the speakers in the vehicle to play audio. The vehicle interface unit 614 can utilize a cable connection or a wireless connection such as blue-tooth to interact with the vehicle or other device.

The location unit 622 can provide location information and can be implemented in many ways. For example, the location unit 622 can be an inertial navigation system, cell-tower location system, accelerometer location system, or any combination thereof. The location unit 622 can be linked with the global positioning system 606, through the communication path 604, to determine location and provide location information. The location unit 622 can include the active and passive components, such as microelectronics or an antenna, for interaction with the communication path 604.

The memory 618, such as a volatile memory, a nonvolatile memory, an internal memory, an external memory, or a combination thereof, can store the first software 620, setup data, multimedia data, photos, text, sounds recordings, video, and other data for the operation of the navigation device. The memory 618 can also store the relevant information, such as maps, route information, traffic information, vehicle information, advertisement, and point of interest (POI), navigation routing entries, driver profiles, or any combination thereof. The memory 618 can also store recorded, imaged, sampled, or created relevant information to be transmitted to the device 602.

The memory 618 can be implemented in a number of ways. For example, the memory 618 can be a nonvolatile storage such as non-volatile random access memory (NVRAM), Flash memory, or disk storage or a volatile storage such as static random access memory (SRAM).

The communication unit 612 can connect with the communication path 604 and can include active and passive components, such as microelectronics or an antenna, for interaction to the telecommunication system of the communication path 604.

The user interface 616, for example, can receive the trip information 303 of FIG. 3, the destination location 312 of FIG. 3, the first event 316 of FIG. 3, and the first start time 322 of FIG. 3 as user input. The control unit 610 can send the trip information 303, the destination location 312, and event of interest information to the memory 618. The control unit 610 can access the global positioning system 606 through the communication unit 612, the location unit 622, or a combination thereof.

The update start location module 304 of FIG. 3 can use the communication unit 612 and the location unit 622 to detect the start location 306 of FIG. 3. The event inventory module 308 of FIG. 3 can use the communication unit 612 to update the event inventory 313 of FIG. 3. The historical module 504 of FIG. 5 can use the communication unit 612 and the location unit 622 to update the historical information 520 of FIG. 5.

The memory 618 can receive and store the trip information 303, the destination location 312, the first event 316, the first start time 322, and the first stop time 340 of FIG. 3. The first software 620 can generate the distance route 424 of FIG. 4, the intermediate route 426 of FIG. 4, the trip itinerary 442 of FIG. 4, the change probability route 434 of FIG. 4, the verified route 440 of FIG. 4 and the event route 444 of FIG. 4. The distance route 424, the trip itinerary 442, the change probability route 434, the verified route 440, and the event route 444 can be displayed on the display interface 624.

The display interface 624 can display and play audio information from the event options module 212 of FIG. 2. The display interface 624 can also display routes and play audio directions from the run navigation module 210 of FIG. 2.

Figure 7:
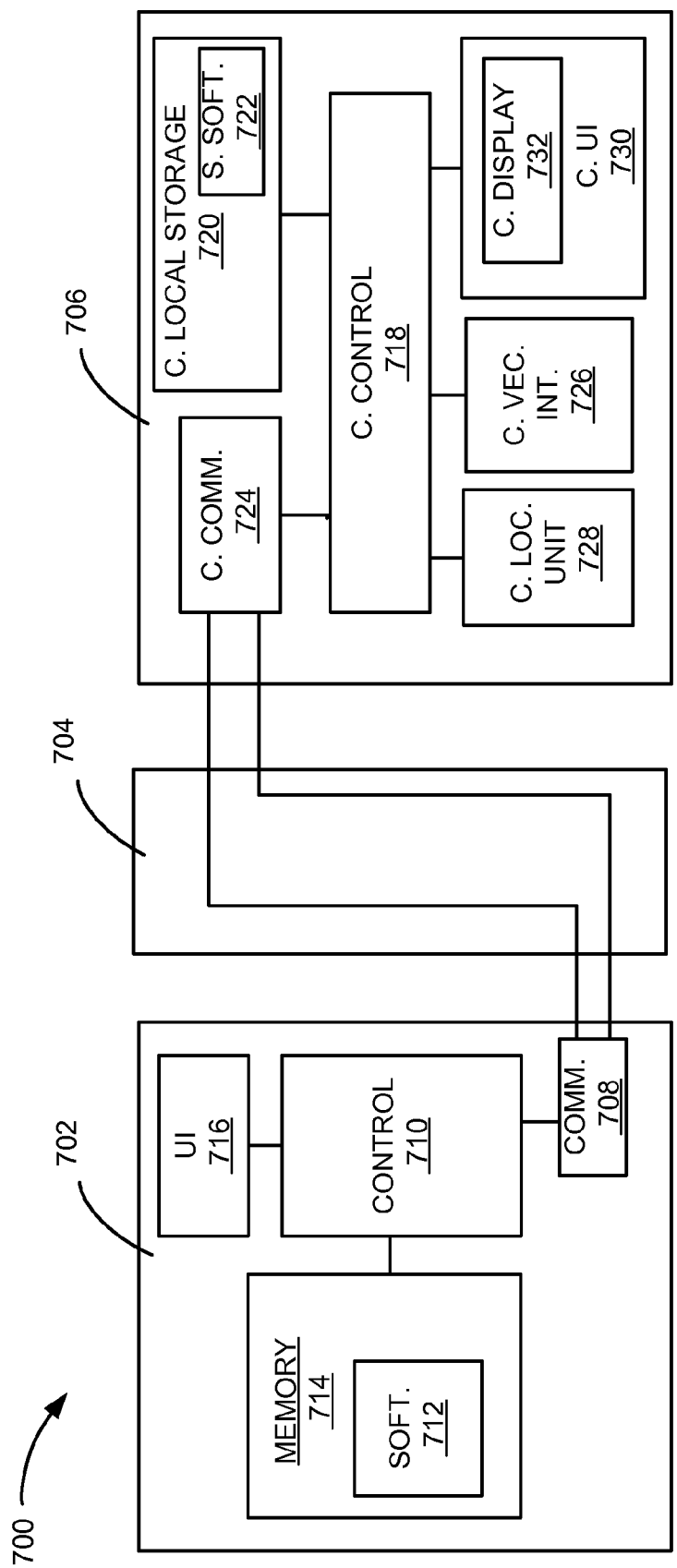
FIG. 7 is a block diagram of a navigation system with event of interest routing mechanism in a third embodiment of the present invention.

Referring now to FIG. 7, therein is shown a block diagram of a navigation system 700 with event of interest routing mechanism in a third embodiment of the present invention. A first device 702, such as a server or non-mobile computing device, can link to a second device 706, such as a client device or a mobile computing device, with a communication path 704. The first device 702 can include routing functions or switching functions for coupling with the communication path 704 to communicate with the second device 706.

The second device 706 can be of any of a variety of mobile devices. For example, the second device 706 can be a cellular phone, personal digital assistant, a notebook computer, or other multi-functional mobile communication or entertainment devices having means for coupling to the communication path 704. The communication path 704 can be a variety of networks similar to networks listed in the communication path 106 of FIG. 1.

For illustrative purposes, the first device 702 is shown as a server. The first device 702 is shown in a single location, although it is understood that the server can be centralized or decentralized and located at different locations. For example, the first device 702 can represent real or virtual servers in a single computer room, distributed across different rooms, distributed across different geographical locations, embedded within a telecommunications network, virtualized servers within one or more other computer systems including grid or cloud type computing resources, or in a high powered client device.

Further, for illustrative purposes, the navigation system 700 is shown with the second device 706 as a client. The second device 706 can be a mobile computing device, although it is understood that the second device 706 can be different types of computing devices. For example, the second device 706 can be a mobile computing device, such as notebook computer, another client device, or a different type of client device.

Yet further, for illustrative purposes, the navigation system 700 is shown with the first device 702 and the second device 706 as end points of the communication path 704, although it is understood that the navigation system 700 can have a different partition between the first device 702, the second device 706, and the communication path 704. For example, the first device 702, the second device 706, or a combination thereof can also function as part of the communication path 704.

The first device 702 can include a server control unit 710, such as a processor or a computer, a server communication unit 708, a user interface 716, and a memory 714. The memory 714 can include a first software 712. The server control unit 710 can be coupled to the server communication unit 708, the user interface 716, and the memory 714.

For illustrative purposes, the navigation system 700 is shown with the first device 702 described with discrete functional units, although it is understood that the navigation system 700 can have the first device 702 in a different configuration. For example, the server control unit 710, the server communication unit 708, the memory 714, and the first software 712 may not be discrete units but may have one or more of the aforementioned units combined into one functional unit.

The server control unit 710 can execute the first software 712 and can provide the intelligence of the first device 702 for interaction with the second device 706. The server control unit 710 can interact with the communication path 704 via the server communication unit 708. The server communication unit 708 can send and receive information through the communication path 704.

The second device 706 can include, for example, a client control unit 718, such as a processor, coupled with a client local storage 720, a second software 722, a client communication unit 724, a client vehicle interface unit 726, a client location unit 728, and a client user interface 730 having a client display interface 732. The client user interface 730 can also include a projector, a key pad, a touchpad, soft-keys, a keyboard, a microphone, a speaker, or any combination thereof to provide data and command inputs to the second device 706. The navigation system 200 of FIG. 2 can be partitioned between the first software 712 and the second software 722.

The client control unit 718 can execute the second software 722 from the client local storage 720. The client control unit 718 can provide the intelligence of the second device 706 for interaction with the first device 702. The second software 722 can allow the second device 706 to interact with the communication path 704 via the client communication unit 724 and with the client location unit 728.

The client vehicle interface unit 726 can interact with a vehicle or other device such as a laptop. For example, if linked to a vehicle, the client vehicle interface unit 726 can access the speakers in the vehicle to play audio. The client vehicle interface unit 726 can utilize a cable connection or a wireless connection such as blue-tooth to interact with the vehicle or other device.

The client location unit 728 can provide location information and be implemented in many ways. For example, the client location unit 728 can be a global positioning system (GPS), inertial navigation system, cell-tower location system, accelerometer location system, or any combination thereof. The client location unit 728 can include the active and passive components, such as microelectronics or an antenna, for interaction with the communication path 704.

The client local storage 720 can store the second software 722, setup data, multimedia data, photos, text, sounds recordings, video, and other data for the operation of the second device 706 as a navigation device. The client local storage 720 can also store relevant information, such as maps, route information, vehicle information, traffic information, advertisement, and point of interest (POI), navigation routing entries, driver profiles, or any combination thereof, from the first device 702 or can be preloaded. The client local storage 720 can also store recorded, imaged, sampled, or created relevant information to be transmitted to the first device 702.

The client local storage 720 can be implemented in a number of ways. For example, the client local storage 720 can be a nonvolatile storage such as non-volatile random access memory (NVRAM), Flash memory, or disk storage, or a volatile storage such as static random access memory (SRAM).

The client communication unit 724 can connect to the server communication unit 708 through the communication path 704. The client communication unit 724 can include active and passive components, such as microelectronics or an antenna, for interaction to the telecommunication system of the communication path 704.

The partitioning of the navigation system 200 can be based on the storage size of the client local storage 720. If the client local storage 720 has a large memory capacity, more modules of the navigation system 200 can be partitioned to the second device 706. The partitioning the of the navigation system 200 can also be based on the processing power or access to the processing power.

For example, the first software 712 can include the event inventory 313 of FIG. 3 and the second software 722 can include the other modules of the navigation system 200. As another example of a partition can have the first software 712 include the calculate route module 206 of FIG. 2, and the event options module 212 of FIG. 2. The second software 722 can include the user input module 204 of FIG. 2.

The partitions described above are provided for the purposes of describing examples of the present invention and are not intended to imply any limitations. A variety of alternative implementations for partitioning the navigation system 200 is possible for the present invention.

For illustrative purposes, user input, such as the trip information 303 of FIG. 3, the destination location 312 of FIG. 3, and event of interest information can be inputted into the client user interface 730. The client control unit 718 can send the trip information 303, the destination location 312, and event of interest information to the first software 712 through the client communication unit 724. For example, the second device 706 can receive the trip information 303, the destination location 312, the first event 316 of FIG, the first start time 322 of FIG. 3, and the first stop time 340 of FIG. 3 from the first device 702 by using the client communication unit 724.

The second software 722 can include the calculate route module 206 of FIG. 2, the run navigation module 210 of FIG. 2, and the event options module 212 of FIG. 2. The client control unit 718 can execute the second software 722.

The update start location module 304 of FIG. 3 can use the client communication unit 724 and the client location unit 728 to detect the start location 306 of FIG. 3. The event inventory module 308 of FIG. 3 can use the client communication unit 724 and the server communication unit 708 to update the event inventory 313 of FIG. 3. The historical module 504 of FIG. 5 can use the client communication unit 724 and the server communication unit 708 to update the historical information 520 of FIG. 5.

The distance route 424 of FIG. 4, the intermediate route 426 of FIG. 4, the trip itinerary 442 of FIG. 4, the change probability route 434 of FIG. 4, the verified route 440 of FIG. 4 and the event route 444 of FIG. 4 can be displayed on the client display interface 732.

The client display interface 732 can display and play audio information from the event options module 212 of FIG. 2. The client display interface 732 can also display routes and play audio directions from the run navigation module 210 of FIG. 2.

Figure 8:
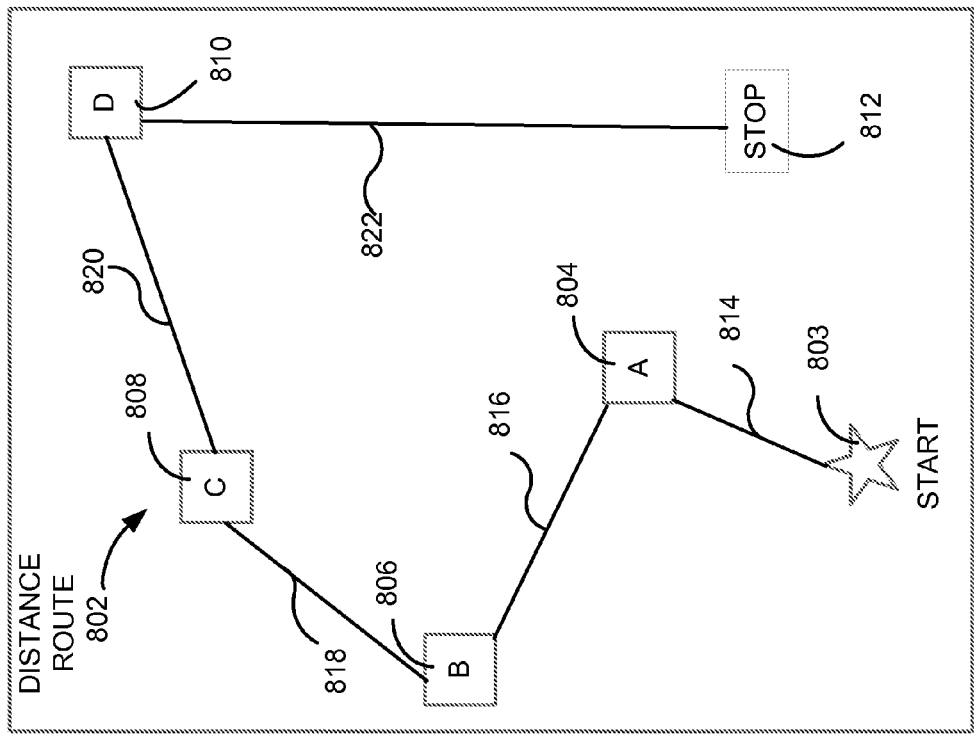
FIG. 8 is a first geographic view of an application of the navigation system of FIG. 2.

Referring now to FIG. 8, therein is shown a first geographic view of an application of the navigation system 200 of FIG. 2. The geographic view can represent a map of a city, country, or region. The geographic view can also represent an event of interest including other events of interest such as a theme park, a museum, or a shopping mall.

The geographic view can depict a distance route 802, a start location 803, a first event 804, a second event 806, a third event 808, an fourth event 810, a destination location 812, a first path 814, a second path 816, a third path 818, a fourth path 820, and a fifth path 822. The paths can represent the route or a route segment from one event to another event of interest. For example, the first path 814 can represent the route from the start location 803 to the first event 804. The combination of the first path 814, the second path 816, the third path 818, the fourth path 820, and the fifth path 822 can represent the distance route 802. The distance route 802 can represent a route that minimizes the total distance traveled.

For illustrative purposes, the geographic view can represent the location of events of interest within a shopping mall. The first event 804 can represent a gift shop. The second event 806 can represent a hair salon. The third event 808 can represent a clothing store. The fourth event 810 can represent a movie theater. The start location 803 can represent the user's current location in the shopping mall. The destination location 812 can represent the user's parked vehicle.

Also for illustrative purposes, the first path 814, the second path 816, the third path 818, the fourth path 820, and the fifth path 822 are shown as linear paths, although it is understood that first path 814, the second path 816, the third path 818, the fourth path 820, and the fifth path 822 can be in different configurations. For example, some or all the paths can be nonlinear paths.

The generate distance route module 402 of FIG. 4 can generate the distance route 802. The distance route 802 can represent the distance route 424 of FIG. 4. If no start times are assigned to any of the events of interest, the distance route 802 can be used as the event route 444 of FIG. 4. For example, the user can input no preferences for event start times for the first event 804, the second event 806, the third event 808, and the fourth event 810. The distance route 802 can serve as the event route 444 for that trip.

Figure 9:
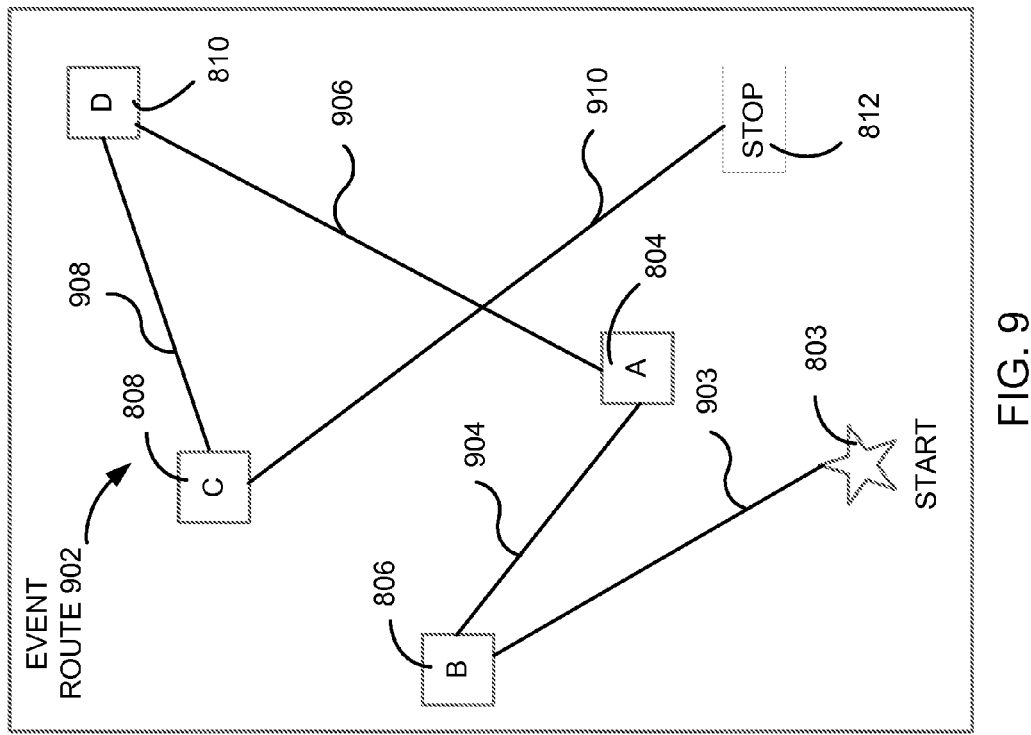
FIG. 9 is a second geographic view of the application of the navigation system of FIG. 2.

Referring now to FIG. 9, therein is shown a second geographic view of the application of the navigation system 200 of FIG. 2. The geographic view can represent the same events of interest from FIG. 8. The geographic view can include the start location 803, the first event 804, the second event 806, the third event 808, the fourth event 810, and the destination location 812 of FIG. 8.

The geographic view can include an event route 902, a sixth path 903, a seventh path 904, an eighth path 906, a ninth path 908 and a tenth path 910. The paths can represent the route from one event of interest to another event of interest. For illustrative purposes, the sixth path 903, the seventh path 904, the eighth path 906, the ninth path 908 and the tenth path 910 are shown as linear paths, although it is understood that these paths can be nonlinear paths.

For illustrative purposes, the geographic view can include the same events of interest inside the shopping mall from the example from FIG. 8. In this example, the user can input event start times and event stop times that correspond with each event of interest in the user input module 204 of FIG. 2. The user can input start times for the hair salon and the movie theater while not assigning times to the gift shop and the clothing store. For example, the first event 804 and the fourth event 810 can have no event start time associations. The second event 806 can have a 9:00 am hair salon appointment time association. The combination of the sixth path 903, the seventh path 904, the eighth path 906, the ninth path 908, and the tenth path 910 can represent the event route 902.

The event inventory module 308 of FIG. 3 can be used to search the event inventory 313 of FIG. 3 for movie show times for the third event 808. For example, the user can input the movie theater into the select nth event module 332 of FIG. 3. The event inventory 313 can display the show times of a movie for that day.

For this example, the movie show times can be 3:00 pm, 6:00 pm, and 10:00 pm. The user can input the 3:00 pm time into the select nth start time module 336 of FIG. 3. For illustrative purposes, the nth start time 338 of FIG. 3 can represent the start time assignment for the third event 808. It is understood that subsequent event of interest entries can be entered into the user input module 204 in a similar manner.

The generate intermediate route module 406 of FIG. 4 can generate the intermediate route 426 of FIG. 4. The intermediate route 426 can represent a route that is based on the time associations for the hair salon and the movie theater. The detect conflict module 408 of FIG. 4 can analyze the intermediate route 426 for any conflicts. The conflict 428 of FIG. 4 can represent the conflicts within the intermediate route 426.

For example, the start time assigned to the hair salon can cause a conflict in the route. If the user begins the event route 902 at 8:55 am, the user cannot use the distance route 802 because the distance route 802 has the first stop at the gift shop or the first event 804. If the user goes to the gift shop first, the user will miss the 9:00 am hair salon appointment. The detect conflict module 408 can detect the overlap between the first event 804 and the second event 806. This overlap can represent the conflict 428.

The calculate segment time module 410 of FIG. 4 can scan the segment travel time 432 of FIG. 4 between the start location 803, the first event 804, and the second event 806. The calculate segment time module 410 can generate the segment travel time 432 which can include the information needed to resolve the conflict 428. The segment travel time 432 can be sent to the resolve conflict module 414 of FIG. 4.

The resolve conflict module 414 of FIG. 4 can assign the conflict 428 to the alternative time 436 of FIG. 4. For example, the resolve conflict module 414 can assign the first event 804 to be after the second event 806. The resolve conflict module 414 can generate the change 430 of FIG. 4. The change 430 can reflect the first event 804 being assigned to after the second event 806. The resolve conflict module 414 can send the change 430 to the verify module 416 of FIG. 4.

The verify module 416 can generate the verified route 440 of FIG. 4. The verified route 440 can represent a route with no conflicts. The verified route 440 can be sent to the select route module 418 of FIG. 4. The select route module 418 can convert the verified route 440 into the event route 444 of FIG. 4. The event route 444 can be sent to the navigation decision module 208 of FIG. 2. The navigation decision module 208 can send the event route 444 to the run navigation module 210 of FIG. 2. The event route 444 can represent the event route 902.

The run navigation module 210 can execute the event route 902. The run navigation module 210 can display the sixth path 903. The sixth path 903 can give directions to the second event 806 because of the 9:00 am appointment time. After the second event 806, the seventh path 904 can give directions to the first event 804 because the gift shop is the next closest event of interest. Since the user assigned a start time of 3:00 pm to the movie theater, the third event 808 can be assigned as the second to the last stop of the event route 902 before the destination location 812.

The eighth path 906 can give directions to the fourth event 810. The fourth event 810 can represent the clothing store.

While at the fourth event 810, the event options module 212 of FIG. 2 can alert the user of the next appointment time at 3:00 pm. The user can resume the event route 902 by taking the ninth path 908 to the third event 808.

If the user decides to prolong the stop at the fourth event 810, the event route 902 can be modified at any time. The user input module 204 of FIG. 2 can be used to modify the event route 902. For example, the start time at the third event 808 can be modified to the 6:00 pm movie show time.

The tenth path 910 can give directions from the third event 808 to the destination location 812. In this example, the destination location 812 can represent the user's parked vehicle. At the destination location 812, the event route 902 has concluded.

The event route 902 can also represent a route based on the change probability 526 of FIG. 5. For example, the movie theater at the third event 808 could have sold out of tickets. Based off the historical information 520 of FIG. 5, the generate change probability module 506 of FIG. 5 can generate the change probability 526. The change probability 526 can represent a 75 percent probability that a seat will open up for the scheduled movie at the third event 808. If the option is available, the manifest module 508 can place the user on the waitlist for the movie theater. The user can select the change probability route 434 of FIG. 4 as the event route 902 at the select route module 418.

Figure 10:
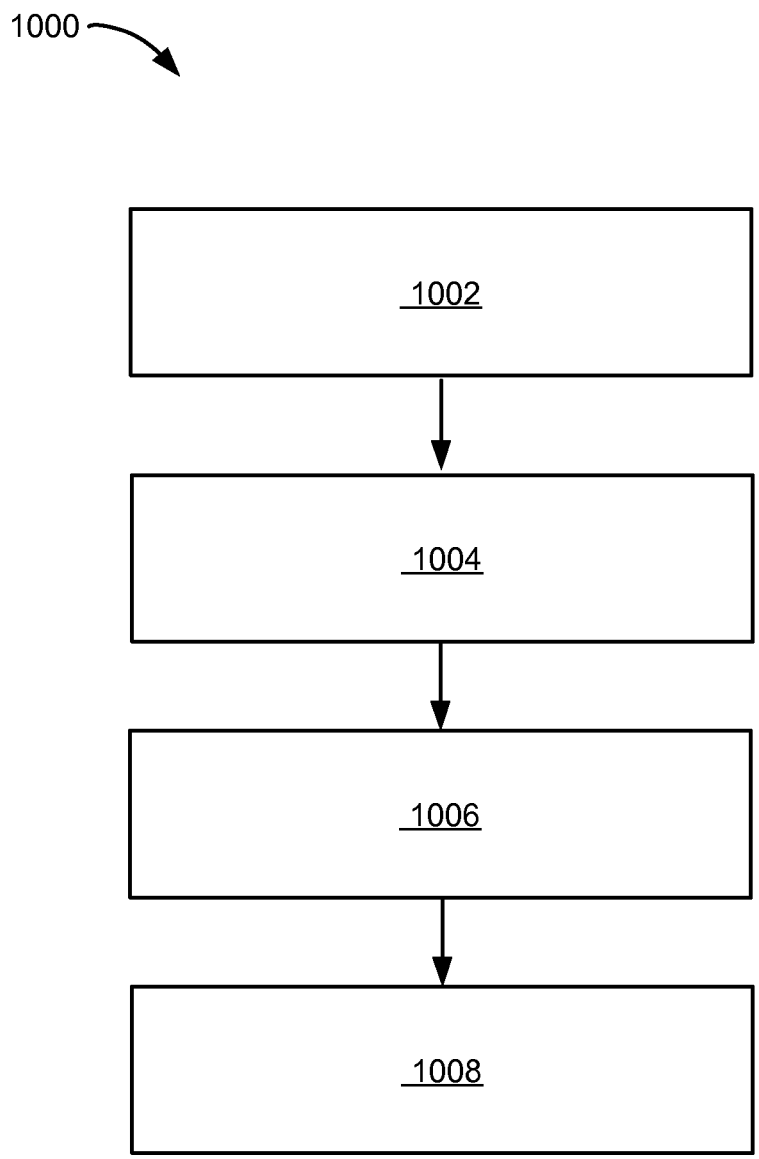
FIG. 10 is a flow chart of a method of operation of a navigation system in a further embodiment of the present invention.

Referring now to FIG. 10, therein is shown a flow chart of a method 1000 of operation of the navigation system 200 in a further embodiment of the present invention. The method 1000 includes: receiving a start location and a destination location in a block 1002; receiving a first start time associated with a first event in a block 1004; receiving a second start time associated with a second event with the first start time subsequent to the second start time and the first event closer to the start location than the second event in a block 1006; and generating an event route, for displaying on a device, from the start location to the second event to the first event to the destination location based on the first start time relative to the second start time in a block 1008.

Yet another important aspect of the present invention is that it valuably supports and services the historical trend of reducing costs, simplifying systems, and increasing performance. These and other valuable aspects of the present invention consequently further the state of the technology to at least the next level.

Thus, it has been discovered that the navigation system of the present invention furnishes important and heretofore unknown and unavailable solutions, capabilities, and functional aspects for improving performance, increasing reliability, increasing safety and reducing cost of using a mobile client having location based services capability. The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations can be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system, using a processor, comprising:
receiving a first start time associated with a first event of an event of interest;
receiving a second start time associated with a second event of the event interest different from the first event;
detecting a conflict based on the first start time overlapping the second start time or vice versa;
extrapolating a change probability of a percent value of the conflict being resolved before the first start time or the second start time; and
generating an event route with a hardware control unit based on the change probability for displaying on a device.

2. The method as claimed in claim 1 wherein:
detecting the conflict includes detecting the conflict between the first event and the second event;
extrapolating the change probability includes generating the change probability for first event or the second event based on a historical information; and
generating the even route includes generating the event route having the conflict that is expected to be resolved before the first event or the second event based on the change probability.

3. The method as claimed in claim 1 wherein:
receiving the first start time associated with the first event includes receiving a first stop time associated with the first event;
receiving the second start time associated with the second event includes receiving a second stop time associated with the second event;
generating the event route includes calculating a segment travel time between the second event and the first event; and
further comprising:
modifying the event route based on a change to the first start time, the first stop time, the second start time, the second stop time, the segment travel time, or a combination thereof.

4. The method as claimed in claim 1 wherein generating the event route includes modifying a distance route with a start location is closer to the first event than the second event and the second event is closer to a destination location than the first event.

5. The method as claimed in claim 1 wherein:
detecting the conflict includes detecting a change with the first event or the second event resulting in the conflict;
generating the change probability includes generating the change probability for the first event or the second event based on a historical information; and
further comprising:
modifying the event route to resolve the conflict between the first event or the second event based on the change probability.

6. A method of operation of a navigation system, using a processor, comprising:
receiving a first start time associated with a first event of an event of interest;
receiving a second start time associated with a second event of the event of interest different from the first event;
detecting a conflict based on the first start time overlapping the second start time or vice versa;
extrapolating a change probability of a percent value of the conflict being resolved before the first start time or the second start time;
generating an event route with a hardware control unit based on the verified route change probability for displaying on a device; and
providing a routing instruction within the event of interest for the first event, the second event, or a combination thereof.

7. The method as claimed in claim 6 wherein:
detecting the conflict includes detecting the conflict between the first event and the second event; and
further comprising:
assigning the first event or the second event to a different day or alternative time for the first event or the second event.

8. The method as claimed in claim 6 wherein:
detecting the conflict includes detecting the conflict between the first event and the second event; and
generating the even route includes removing the conflict from the event route.

9. The method as claimed in claim 6 wherein:
detecting the conflict includes:
detecting a change in the first event or the second event, detecting the conflict based on the change, and
further comprising:
assigning the first event or the second event to a different day or an alternative time for the first event or the second event.

10. The method as claimed in claim 6 wherein:
receiving the second start time associated with the second event includes receiving a second stop time associated with the second event; and
generating the event route includes:
calculating a segment travel time between the second event and the first event, and
verifying the second stop time plus the segment travel time is prior to the first start time.

11. A navigation system comprising:
a communication unit for receiving a first start time associated with a first event of an event of interest; and
a hardware control unit, coupled to the communication unit, for:
receiving a second start time associated with a second event of the event interest different from the first event,
detecting a conflict based on the first start time overlapping the second start time or vice versa,
extrapolating a change probability of a percent value of the conflict being resolved before the first start time or the second start time, and
generating an event route based on the verified route for displaying on a device.

12. The system as claimed in claim 11 wherein the hardware control unit is for:
detecting the conflict between the first event and the second event;
a generating the change probability for the first event or the second event based on a historical information; and
generating the event route having the conflict that is expected to be resolved before the first event or the second event based on the change probability.

13. The system as claimed in claim 11 wherein:
the communication unit is for receiving a first stop time associated with the first event; and
the hardware control unit is for:
receiving a second stop time associated with the second event,
calculating a segment travel time between the second event and the first event, and modifying the event route based on a change to the first start time, the first stop time, the second start time, the second stop time, the segment travel time, or a combination thereof.

14. The system as claimed in claim 11 wherein the hardware control unit is for modifying a distance route with a start location closer to the first event than the second event and the second event is closer to a destination location than the first event.

15. The system as claimed in claim 11 wherein the hardware control unit is for:
   detecting the change with the first event or the second event resulting in the conflict;
   generating the change probability for the first event or the second event based on a historical information; and
   modifying the event route to resolve the conflict between the first event or the second event based on the change probability.

16. The system as claimed in claim 11 wherein the hardware control unit is for providing a routing instruction within the event of interest for the first event, the second event, or a combination thereof.

17. The system as claimed in claim 16 wherein the hardware control unit is for detecting the conflict between the first event and the second event and for assigning the first event or the second event to a different day or alternative time for the first event or the second event.

18. The system as claimed in claim 16 wherein the hardware control unit is for:
   detecting the conflict between the first event and the second event; and
   generating the event route to remove the conflict.

19. The system as claimed in claim 16 wherein the hardware control unit is for:
   detecting a change in the first event or the second event;
   detecting the conflict based on the change; and
   assigning the first event or the second event to a different day or an alternative time for the first event or the second event.

20. The system as claimed in claim 16 wherein the hardware control unit is for:
   receiving a second stop time associated with the second event;
   calculating a segment travel time between the second event and the first event; and
   a verifying the second stop time plus the segment travel time is prior to the first start time.

* * * * *